United States Patent [19]
Vosteen

[11] 3,887,877
[45] June 3, 1975

[54] FEEDBACK ELECTROSTATIC VOLTMETER

[76] Inventor: Robert E. Vosteen, 15 W. Center St., Medina, N.Y.

[22] Filed: Mar. 26, 1973

[21] Appl. No.: 344,511

Related U.S. Application Data

[60] Continuation of Ser. No. 66,444, Aug. 24, 1970, abandoned, which is a division of Ser. No. 567,973, July 26, 1966, Pat. No. 3,525,936.

[52] U.S. Cl. .................... 330/10; 330/26; 324/72; 307/261; 329/103
[51] Int. Cl.² ........................................... H03F 3/38
[58] Field of Search ............. 330/10; 307/261, 268; 329/112, 146, 103

[56] References Cited
UNITED STATES PATENTS

| | | | |
|---|---|---|---|
| 3,234,478 | 2/1966 | Braymer | 330/10 X |
| 3,407,358 | 10/1968 | Ott | 329/103 X |

*Primary Examiner*—Nathan Kaufman

[57] ABSTRACT

This invention relates to an electrostatic voltmeter which provides accurate measurement of the electrostatic potential of a small surface area, without physical contact therewith. More particularly, it relates to the utilization of solid state elements to provide improved transient response, characterized by superior performance, stability, reliability and ease of maintenance of an electrostatic voltmeter.

4 Claims, 6 Drawing Figures

FEEDBACK ELECTROSTATIC VOLTMETER

This application is a continuation of application Ser. No. 66,444 filed Aug. 24, 1970, now abandoned which in turn is a divisional application of application Ser. No. 567,973 filed July 26, 1966 now U.S. Pat. No. 3,525,936.

The system disclosed herein provides accurate metering and recording of the electrostatic potential of a surface. It utilizes a detector probe out of contact with the surface being measured, thereby preventing errors in potential measurement. Further, the system provides for the generation of a reference signal simultaneously with the detected electrostatic signal, which is utilized to determine the polarity of the D.C. voltage difference between the detector probe and the surface being measured.

The detected signal and the reference signal are fed to identical tuned amplifiers to provide phase tracking between the respective signals, as well as to maximize the signal to noise ratio. The signals are then detected and compared by a Phase Sensitive Detector which produces an output D.C. voltage the amplitude and polarity of which are determined by the amplitude and phase of the detected electrostatic signal.

The Phase Sensitive Detector feeds a high level D.C. integrating amplifier network having an output level of approximately ±2,000 volts D.C. Its output polarity is identical to the unknown electrostatic surface charge, and its amplitude is proportional to the amplitude of the electrostatic surface charge. The output of the integrating amplifier is fed back directly to the frame of the detector probe. By simply metering and/or recording the output of the D.C. Integrating Amplifier network, an accurate indication of the electrostatic potential polarity and amplitude is obtained.

PRIOR ART

Non-contacting electrostatic potential measurement has traditionally taken two forms.

The first utilizes an open grid D.C. electrometer tube amplifier connected to an electrode in close physical proximity to the surface under measurement. This results in an output inversely proportional to the spacing between the electrode and the surface under measurement thus being spacing sensitive. It is further subject to a slow, continuous, rather unpredictable drift necessitating periodic shorting of this electrode to ground to re-establish the system zero.

The second utilizes a simple electrostatic chopper similar to that described in this device. The chopped electrostatic signal is simply fed to an A.C. amplifier whose output is metered. This system eliminates the drift problem but still results in an output inversely related to spacing. This system is basically incapable of determining the polarity of the unknown voltage.

OBJECTS OF THE INVENTION

It is an object of the invention to simultaneously generate a reference signal having a frequency identical to that of the modulating frequency of the detected signal, which may be used to determine the phase of the detected signal after detection, and which may further be utilized to provide a chopping frequency to produce a high voltage gain with low drift.

It is still another object of the invention to provide a solid state Feedback Electrostatic Voltmeter with improved speed of response and signal to noise ratio, as well as superior accuracy, stability, reliability and ease of maintenance.

It is another object of the invention to provide a novel filter arrangement in the demodulator circuit which simultaneously permits filtering with little phase shift, and permits driving the output in both directions.

It is still another object of the invention to utilize identical tuned amplifiers in the detected signal and reference signal branches of the Feedback Electrostatic Voltmeter tuned to the modulating frequency, to provide phase tracking between both the detected and reference signals, and to minimize noise.

It is also an object of invention to provide a high voltage, high gain operational amplifier.

Another object of invention is to provide a high impedance ratio from The Demodulator output to the metering and recording inputs, thereby preventing overloading of the Demodulator.

DESCRIPTION OF THE INVENTION

These and other objectives of the invention will be apparent from the following specifications and drawings in which FIG. 1 is a block diagram of the Feedback Electrostatic Voltmeter, the electrical components and their interconnection comprising the Feedback Electrostatic Voltmeter.

Figure 1:
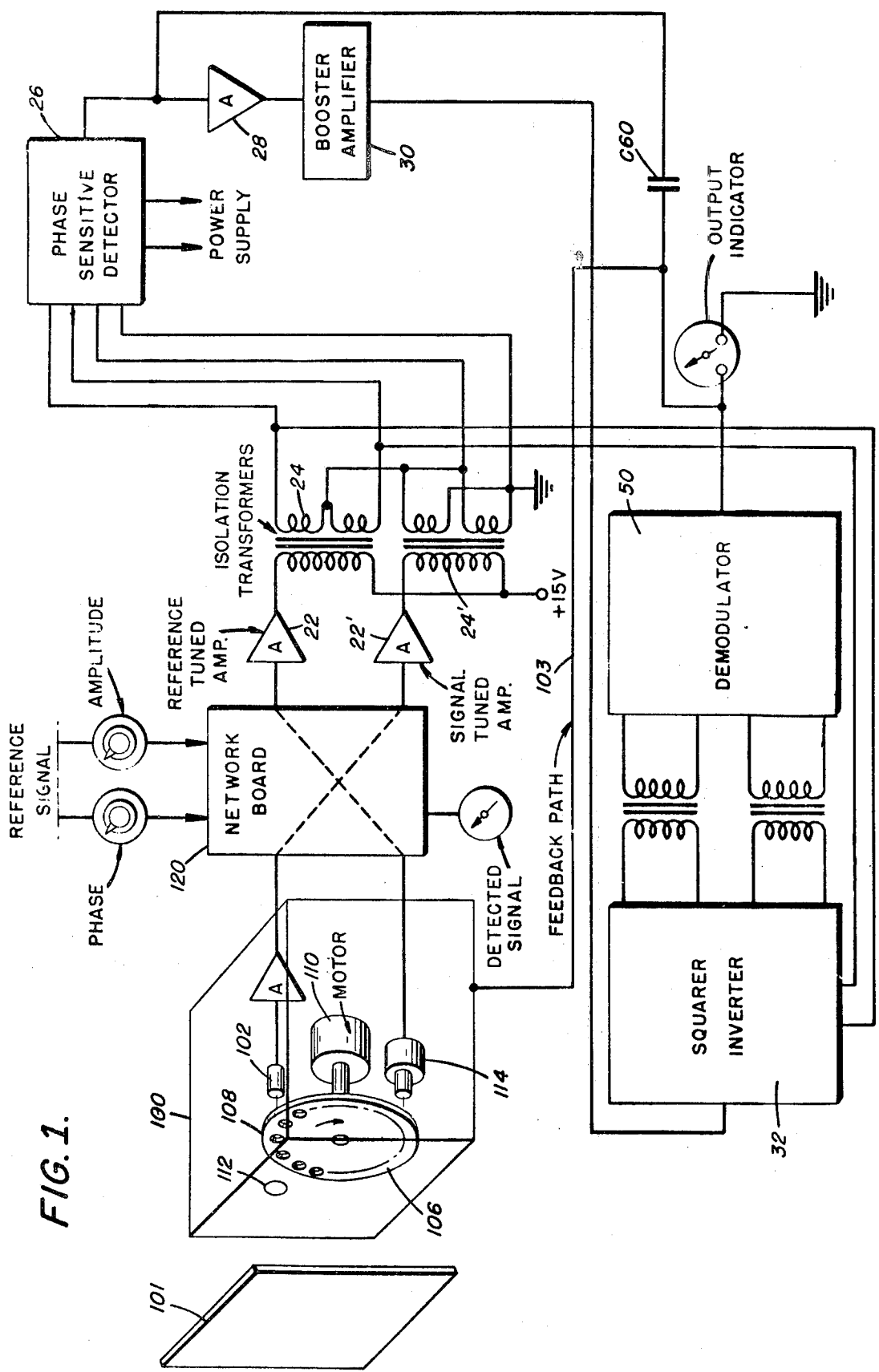

FIG. 1 illustrates the Detector Preamplifier probe 100 spaced from the unknown surface 101 being measured. The Detector probe comprises an electrostatic electrode Detector 102. The Detector head must be mounted in close proximity to the surface area whose potential is to be monitored. For high accuracy work, the separation between the surface and the head should not exceed one-eighth inch. For less critical measurements (±1%) separation up to one-half inch is permissible, providing a degeneration in surface resolution is permissible.

The Electrostatic Detector looks through chopping disc 106, which defines a plurality of apertures 108 adjacent to the outer periphery thereof. Motor 110 drives chopping disc 106, at approximately 3600 rpm. The base of probe 100, defines opening 112 which is in line with apertures 108 on the chopping disc; that is, it is located at an equal radial distance from the longitudinal axis of the probe.

As the chopping disc rotates, it chops opening 112, and varies the capacitance between electrostatic surface 101 and electrostatic electrode 102. Chopping disc 106 may comprise a gold plated steel surface to minimize contact potential. The sequential movement of apertures and gold plated steel surface between the electrostatic surface 101 and electrostatic electrode 102 causes the capacitance therebetween to vary. This results in capacitive modulation of the electrostatic charge being detected by the Electrostatic Electrode 102. The frequency of modulation is determined by the number of apertures and the speed of rotation of the chopping disc. Assuming, the chopping disc rotates at 3600 rpm. and defines 18 apertures, the frequency of modulation will be 1,080 cps. However, other modulating frequencies can also be used, and this invention is not limited to a modulation frequency of 1,080 cps.

The signal induced on the electrostatic electrode is therefore an alternating voltage, the phase of which varies according to the polarity of the electrostatic potential on the surface being measured. It is modulated at a frequency of 1,080 cps.

Simultaneously, a magnetic reference pickup 114 produces a 1,080 cps. constant alternating voltage reference signal, since the gold plated chopping disc 106 varies the reluctance of the medium surrounding the electromagnetic pickup, and modulates the constant electromagnetic field at a frequency of 1,080 cps.

The output of demodulator 50 is equal in amplitude and polarity to the potential on the surface to be measured, as explained hereafter within a small fraction of one percent. This output is applied to the housing 100 through a feedback path 103. The signal applied to the preamplifier 105 is proportional to that potential difference between the surface under test 101 and the housing 100.

The initial subjection of the electrostatic voltmeter of the invention to a surface having an electrostatic charge, the potential of which is to be measured, results in the possibility of a very high input signal to the preamplifier 105, since the housing is initially at ground potential. As will be explained hereafter, the system inherently limits the output voltage which it produces, so that no excessive outputs voltage is developed.

Although the high input signal may cause a momentary saturation of the system, the housing potential is raised within a few milliseconds to a value approximately equal to that of the charged surface. Thereafter, variations in the potential of the charged surface produce a corresponding variation in the potential of the detector preamplifier probe.

The Detector probe also contains a preamplifier to increase the level of the signal induced on the electrostatic electrode, since it is relatively weak. The detected electrostatic signal and the reference signal are then fed via separate lines to Network Board 120. Network Board 120 comprises a conventional phase lag network, to which the reference signal is fed. It is necessary to change the phase of the reference signal initially induced in the magnetic pickup 114 since it leads the flux by 90°. By feeding the induced reference voltage through a 90° lag network, the correct phase relationship is developed between the detected electrostatic signal and the reference signal. Network Board 120 also comprises gain controls for both the reference signal and the detected electrostatic signal. As illustrated in FIG. 1, the signals are cross-switched in the network board and are then applied to their respective tuned amplifiers.

Reference Signal Tuned Amplifier 22 and Detected Signal Tuned Amplifier 22' are identical and are tuned to the same center frequency. Therefore, similar phase responses versus frequency characteristics are obtained from the respective amplifiers. Thus, phase deviations due to frequency variations are similar for the reference signals and the detected electrostatic signals providing phase tracking between the respective signals.

In the instance where the modulating frequency is 1,080 cps, amplifiers 20 and 22' are tuned to a center frequency of 1,080 cps and a bandwidth of approximately 200 cps. The narrow bandwidth increases the signal to noise ratio of the system which functions at an extremely high gain level and is therefore noise prone. Further, by having a center frequency identical to the high input modulating frequency, the phase of the reference signal and the detected electrostatic signal is tracked.

The output signals from Tuned Amplifiers 22 and 22' are fed respectively to the primary windings of isolation transformers T-2 and T-3. The secondary winding of T-2 is center tapped, the center tap connections being connected to one end of each of the secondary windings of transformer T-3. The other ends of secondary windings T-3 are connected to ground.

The top half of secondary winding T-2 is thus connected in additive relation to the detected signal induced in the secondary of transformer T-3; therefore a voltage input proportional to the Detected Signal plus the Reference (Ds+Rs) is developed at Input 7 of the Phase Sensitive Detector 26. The bottom half of the secondary winding of T-2 is connected so as to subtract from the Detected Signal of winding T-3; therefore a signal portional to the Detected Signal minus the Reference Signal (Ds−Rs) is developed at Input 4 of the Phase Sensitive Detector 26 (see FIGS. 2 and 3).

Diodes D30 and D30' detect the voltages applied to inputs 4 and 7, which are then converted to constant D.C. voltages by the filter arrangement.

The detected signal voltage should normally be either in phase or in phase opposition with respect to the reference signal voltage.

If zero detected signal is translated, equal amplitude reference signals will be developed across Inputs 4 and 7 of the Phase Sensitive Detector, which will be opposite in phase as explained heretofore. Therefore, equal but opposite voltages will be developed across C30 C30' and thus between J-1 and J-2. The two voltages will therefore be cancelled at the output of the Phase Sensitive Detector, assuming the resistance of the path between J-1 to the output of the Phase Sensitive Detector equals the resistance of the path from J-2 to the output of the Phase Sensitive Detector. Thus resistors R9 and R11 are selected to be equal in value.

The arm of integrator zero control 34 across resistor R11 should then be at a balance point permitting no current flow to ground, in the event of a short circuit to ground, under these conditions. Normally, the arm 34 would be at the midpoint of resistance R11 in this case.

If we now assume a detected signal of one volt peak amplitude which is in phase with the reference signal voltage feeding input 4, and thus in phase opposition to the reference signal voltage feeding 7, the D.C. potential of J-1 will increase one volt, while that of J-2 will decrease one volt. Thus, a short circuit current derived from the voltage of J-1 via R9 of approximately 10 microamperes will flow (assuming R9 equals 100 K-ohms). Similarly, a current of 10 microamperes derive from J-2 via R10 will flow, providing a total of 20 microamperes of short circuit current (assuming R10 equals 100 K-ohms).

Should the phase of the detected signal voltage be reversed, the same short current circuit, but of opposite polarity, will flow. The output from the Phase Sensitive Detector is a current whose magnitude is linearly related to the peak signal amplitude and whose polarity reverses with phase reversal. The Peak Sensitive Detector described discriminates against any quadrature component (90° lagging or leading) of the detected electrostatic signals because the transformer components will be cancelled out as a result of the isolation transformer connections to Inputs 4 and 7.

Diodes D32 and D33 are protective rectifiers to eliminate high level spikes from the output voltage. The combination of R13 amd C34 provide drift compensation. Resistor R30 connected between Input 5 and ground provides a resistance load for T-3 to improve transient response.

Figure 2:
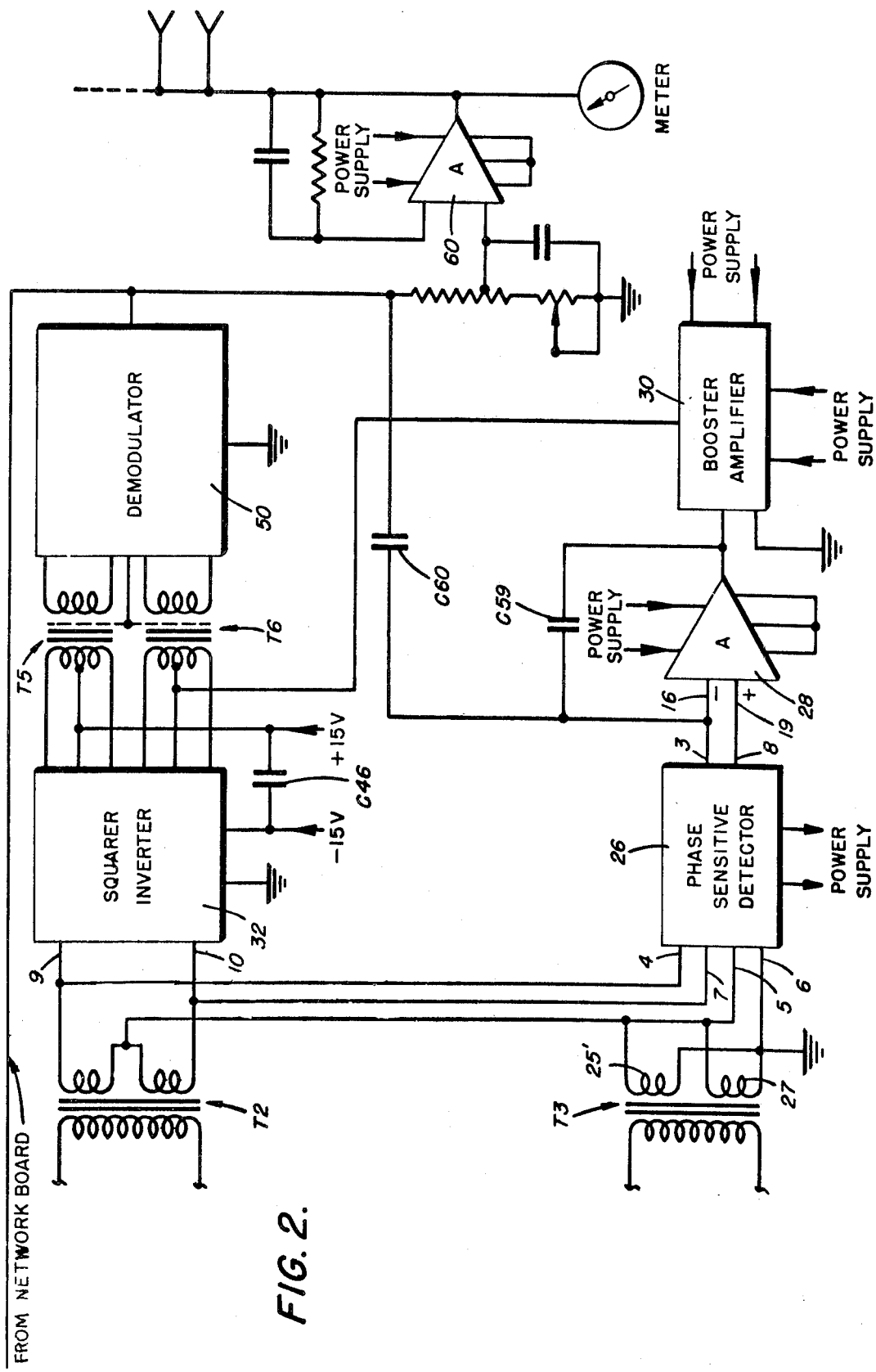
FIG. 2 is a block diagram of the High Voltage Operational Amplifier being fed by the Phase Sensitive Detector, and the isolation transformer connections thereto, as well as a schematic of the metering circuit.
Figure 3:
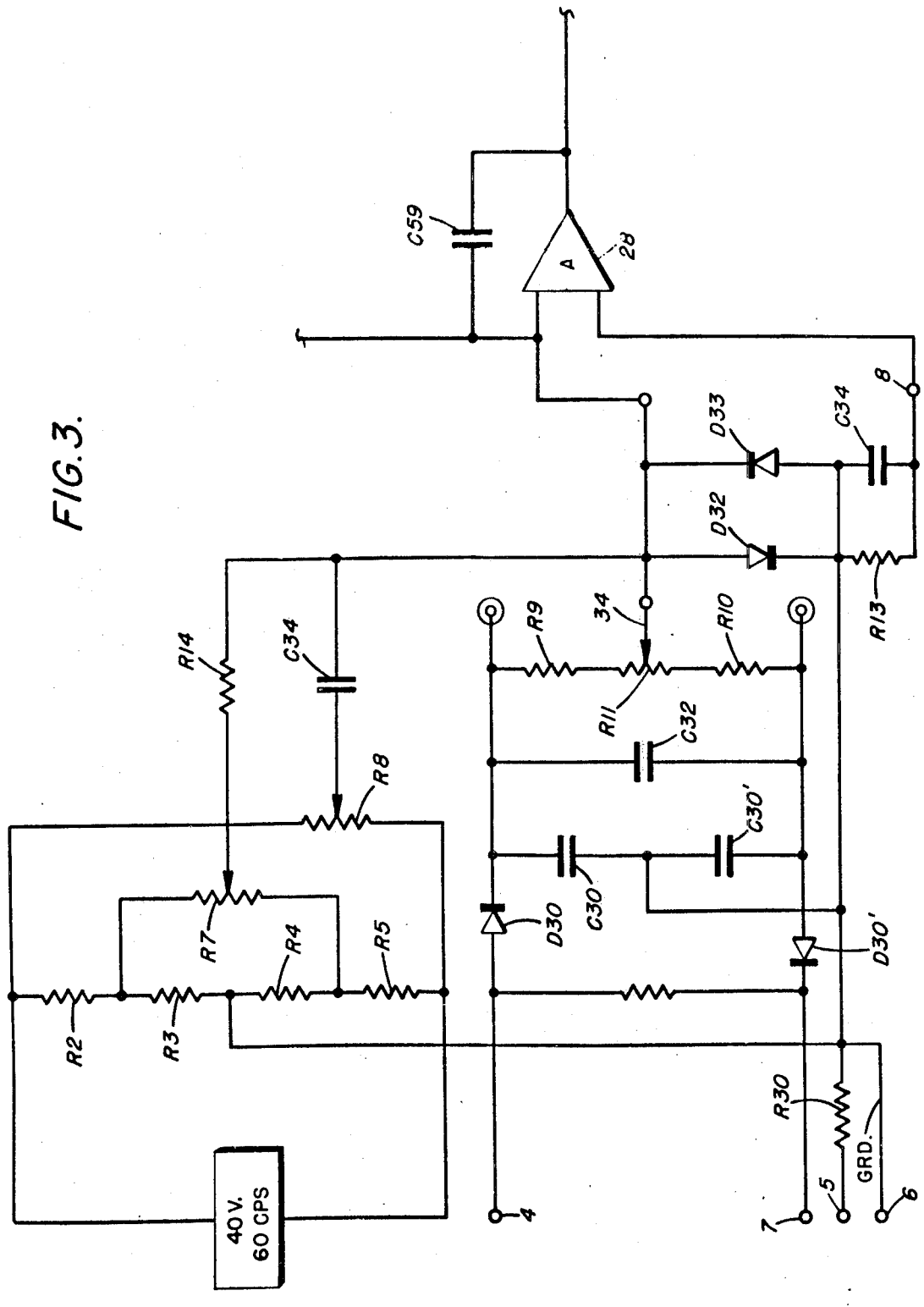
FIG. 3 is a schematic diagram of the Phase Sensitive Detector.

The output from the Phase Sensitive Detector is then fed to Operational Amplifier 28 (FIG. 2). The operational amplifier is responsive to low input voltage and provides low current drift, and has a gain approximating 50,000. Output 8 of the Phase Sensitive Detector is connected to the positive terminal 19 of Operational Amplifier 28. The negative input 16 of the Operational Amplifier is an inverting connection; that is, a negative input results in a positive output, and vice versa. On the other hand, positive input terminal 19 to the Operational Amplifier 28 is a non-inverting connection; that is, a positive input results in a positive output.

As illustrated in FIG. 2, the output of the operational amplifier 28 is fed directly to Booster Amplifier 30. Booster amplifier 30 is capable of producing approximately ±250 milliamperes current as output and slight non-inverting voltage gain. The output of the booster amplifier 30 is connected to the input of the inverter portion of Squarer Inverter 32. Squarer Inverter 32 can best be understood from FIG. 4 of the drawings, which schematically illustrate the squarer and inverter portions of the circuits.

The input to the Squarer portion is the reference signal applied to terminals 9 and 10 from transformer T-2. The secondary of the input transformer T-4 is split and thereby applies an equal and opposite voltage to Transistors Q-1 and Q-2. Transistors Q-1 and Q-2 are connected in a free running multi-vibrator circuit which in the absence of a synchronizing signal, operates at about 400 cycles per second and supplies drive to the switching transistors in the following inverters.

It is advantageous to operate the inverter synchronized to the system reference signal frequency, in order to minimize noise. For this reason, the input to the Squarer is taken from Isolation Transformer T-2.

The transistors Q-1 and Q-2 thus function to convert the sinusoidal reference signal frequency, to a square wave drive for the inverter portion. Capacitors C40 and C41 in combination with resistors R41 and R42 respectively form the filtering circuit for the output of the transistors Q-1 and Q-2 and apply the square wave output to the primaries of Output Transformers T-7 and T-8. The secondaries of Transformers T-7 and T-8 then feed the square waves to the inverters across oppositely poled Diodes D40 and D41, and D42 and D43, respectively. Thus a full wave rectified signal input is applied to the inverters.

Figure 4:
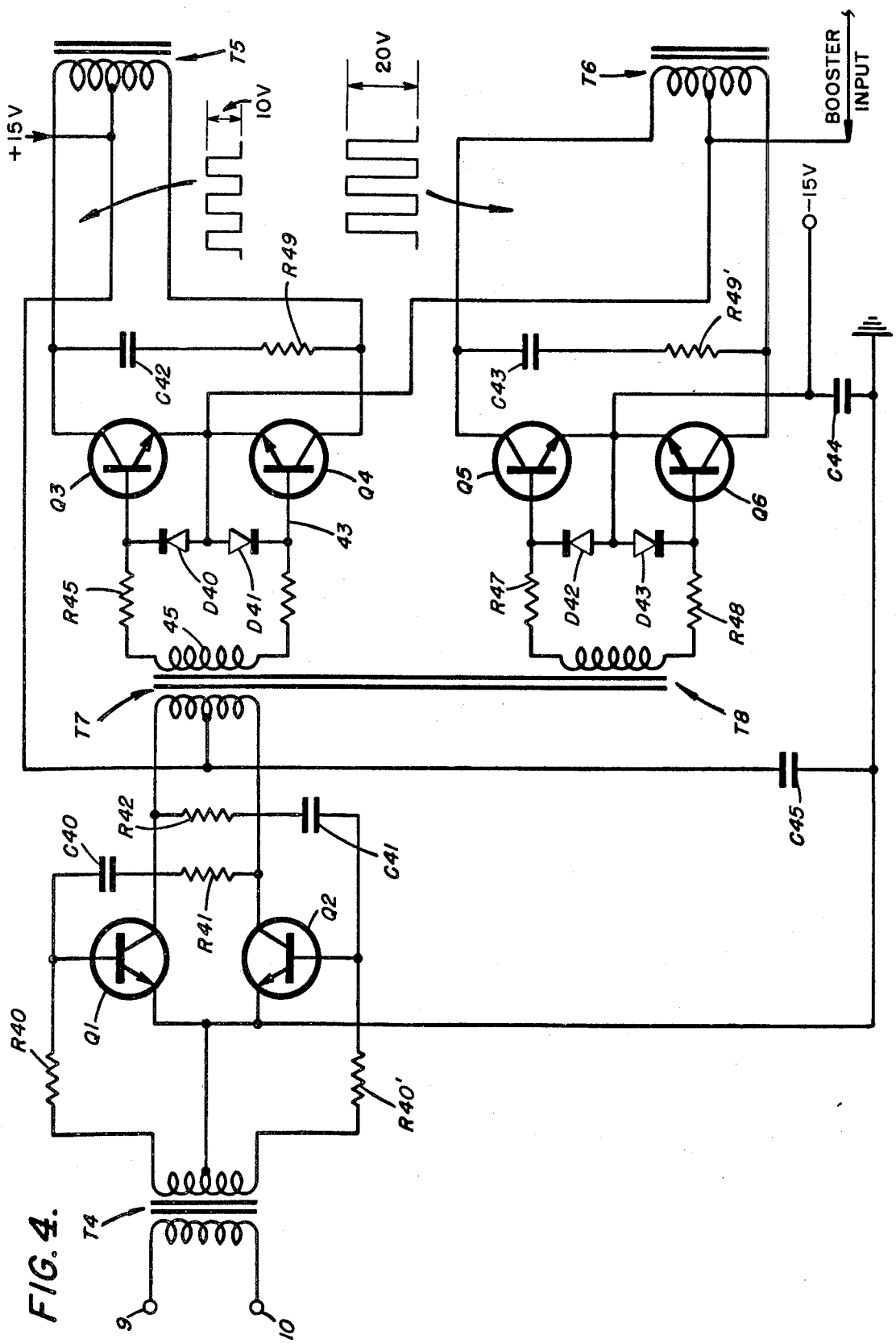
FIG. 4 is a schematic diagram of the Squarer inverter. inverter

The inverter portions 43 and 44 comprise transistors Q-3 and Q-4, and Q-5 and Q-6 respectively. It is seen from FIG. 4 that the Inverters 43 and 44 are connected in series between plus 15 volts and minus 15 volts supplies. Their midpoint connection is fed from the output of the booster amplifier as illustrated in FIGS. 2 and 4. If the output of the booster amplifier 30 is zero, 15 volts D.C. is converted by each inverter into a 15 volt square wave because the inverters are connected in series across a D.C. potential of 30 volts. This voltage is then stepped up by step-up transformers T-5 and T-6 respectively, by a ratio of approximately 200 to 1. The output of each inverter would therefore be a 3,000 volt square wave.

Assume, however, that the input to the inverter from booster amplifier 30 is plus 5 volts. Inverter 43 then has 10 volts D.C. to chop (+15 −plus 5) which produces 10 times 200+2,000 volts out of the full wave rectified signal input. Further, the inverter would have 20 volts D.C. to chop (−15 +minus 5) which produces −20×200 or −4,000 volts out of the full wave rectified signal. (These voltages are instantaneous values since the detected signal and therefore the booster output may vary.) The inverter, therefore, modulates the applied input from the booster amplifier at a chopping frequency of 1,080 cps (since the reference signal synchronizes the Inverters at this frequency) thereby permitting the booster output to be easily stepped up to a high voltage level using tranformers T-5 and T-6.

After the high voltage level is obtained at the secondaries of transformers T-5 and T-6, it is therefore necessary to demodulate the signals.

Thus, the secondaries of transformers T-5 and T-6 are connected to the Demodulator 50 as illustrated in FIG. 2.

Figure 5:
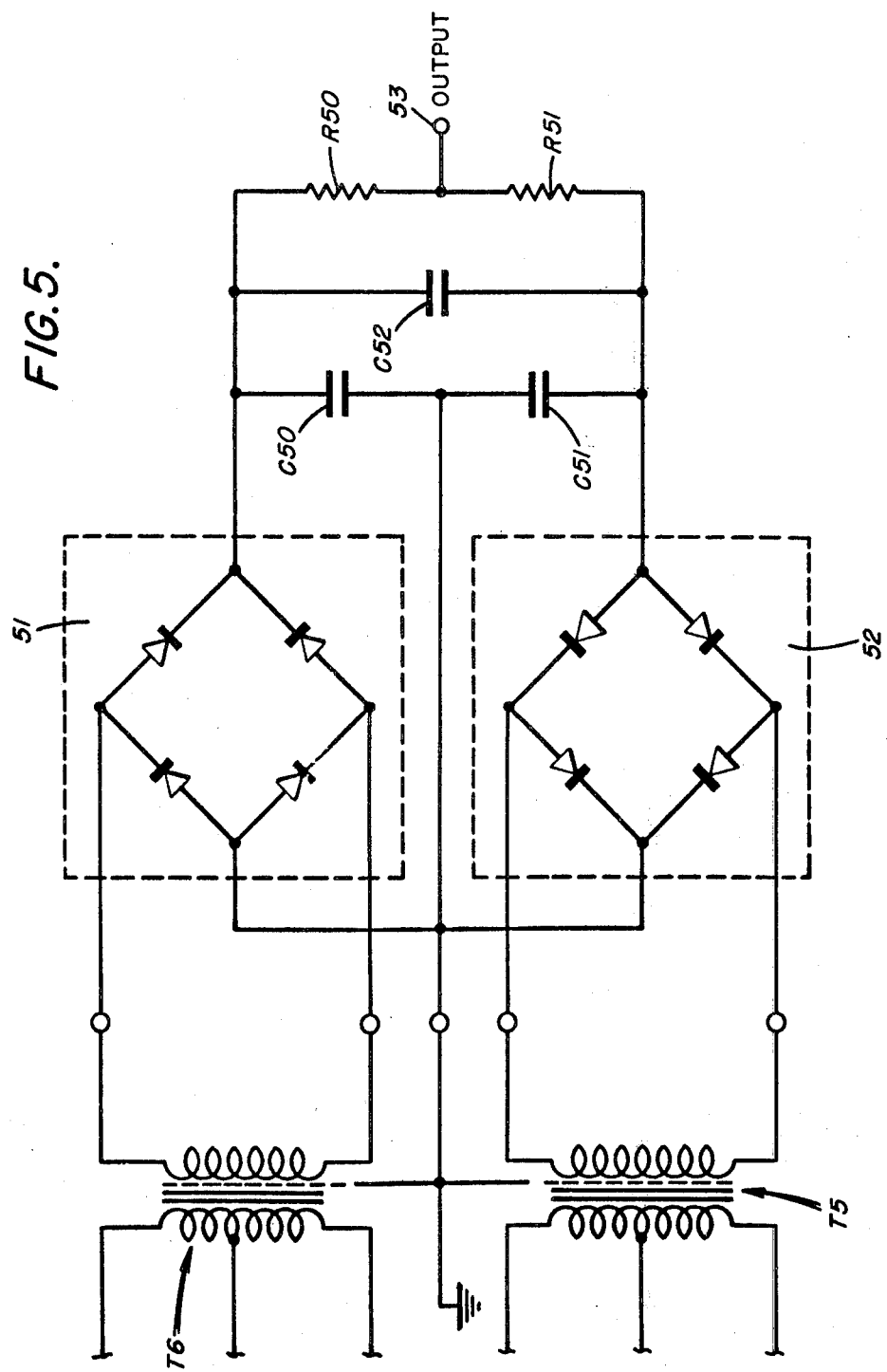
FIG. 5 is a schematic diagram of the Demodulator.

The circuitry of Demodulator 50 is illustrated in FIG. 5 and shows a conventional full wave bridge rectifier connected across each Transformer T-5 and T-6. The bridge rectifiers demodulate the outputs from the Squarer inverter and more particularly the 1,080 cps chopping frequency. The output from the bridge rectifiers are fed to filter circuits comprising capacitors C40 and C51, C52; Capacitors C50 and C51 are of equal capacitance, and C52 is approximately equal to ten times the capacitance of C50 and C51. The output of the High Voltage Demodulator 50 therefore comprises a D.C. voltage proportional to the difference in amplitude of the high voltage square wave inputs.

Assuming that no voltage is applied from the booster amplifier 32 to the midpoint of Inverters 43 and 44, Transformers T-5 and T-6 will each be at the same voltage. When the outputs of transformers T-5 and T-6 is applied to Demodulator 50, they will produce equal and opposite voltages across R50 and R51 providing zero output at Terminal 53.

The synchronizing frequency of the inverters need not be the reference signal of 1080 cps. Use of the reference signal is convenient, however, and helps to prevent unwanted noise components from being introduced.

However, assume that five volts positive is applied from the booster amplifier to the mid-point of the Inverter Sections 43 and 44. Then, T-5 will produce plus 2,000 volts, and T-6 will produce minus 4,000 volts (instantaneous values) as explained above. After detection, the voltage developed across C50 will be +4 KV D.C. and the voltage developed across C51 will be +2 KV D.C. (the positive terminals of the capacitors being indicated in FIG. 5). The voltage across C52 remains constant and is equal to the voltage applied to T-5 and T-6, or 6 KV D.C.

If R50 and R51 are equal in resistance values, the output of the Demodulator 50 will be +1 KV D.C. ([4

KV−2 KV]r 2). Thus, it can be seen that the output from Demodulator 50 is equal to the unknown electrostatic voltage being measured. The amplitude of the Demodulator output is an output voltage equal to the amplitude of the electrostatic potential of the surface, and the polarity of the output voltage equals the polarity of the electrostatic voltage.

The filter network of the Demodulator permits filtering with very little phase shift. C52 is approximately ten times greater in capacitance value than equal capacitors C50 and C52. Therefore the filter network can be driven R50 both directions, that is, from R or from R51, depending upon the relative amplitude of the inputs to T-5 and T-6.

In a conventional capacitance filter circuit, the charging voltage across the capacitor can rise nearly as fast as the rectifier output. In other words, the RC charge time is relatively short, and the capacitor is charged to the peak voltage of the rectifier within a fraction of a cycle. When the rectifier output falls to zero, the voltage across the capacitor does not fall immediately. Instead the energy stored in the capacitor is discharged through the load, the RC discharge time being relatively long assuming a large capacitance and a relatively large value of load resistance are employed.

The utilization of the filter arrangement shown and the relative capacitance values recited overcome this limitation. The value of the square wave amplitude follows proportionately the booster input except during the small but finite square wave switching time. It is only necessary that the RC discharge time of the filter be long as compared with this switching time (less than 50 microseconds). If the booster now suddenly changes from 0 volts to +5 volts, the square wave out of T-6 will suddenly increase from 3KV peak-to-peak to 4KV peak-to-peak while that out of T-5 will suddenly decrease from 3KV peak-to-peak to 2KV peak-to-peak. As the voltage feeding rectifier 52 will be less than the voltage on C-51, the rectifier will be unable to conduct. However, that on T-6 will cause rectifier 51 to conduct heavily until C-50 is charged to +4KV. C-52, being much larger than C-51, will remain essentially constant in voltage while discharging C-51 to 2KV at which point equilibrium as relates to rectifier conduction will soon be re-established due to the discharging effect of R-50 and R-51. We have thus produced an output voltage change at a rate dictated by the relatively short charge time constant [approximately, rectifier/source resistance X 2(C-50)$\pi$, this change being at the same rate regardless of the magnitude or polarity of the change.

A similar filter arrangement is used in the phase sensitive detector 26.

Figure 6:
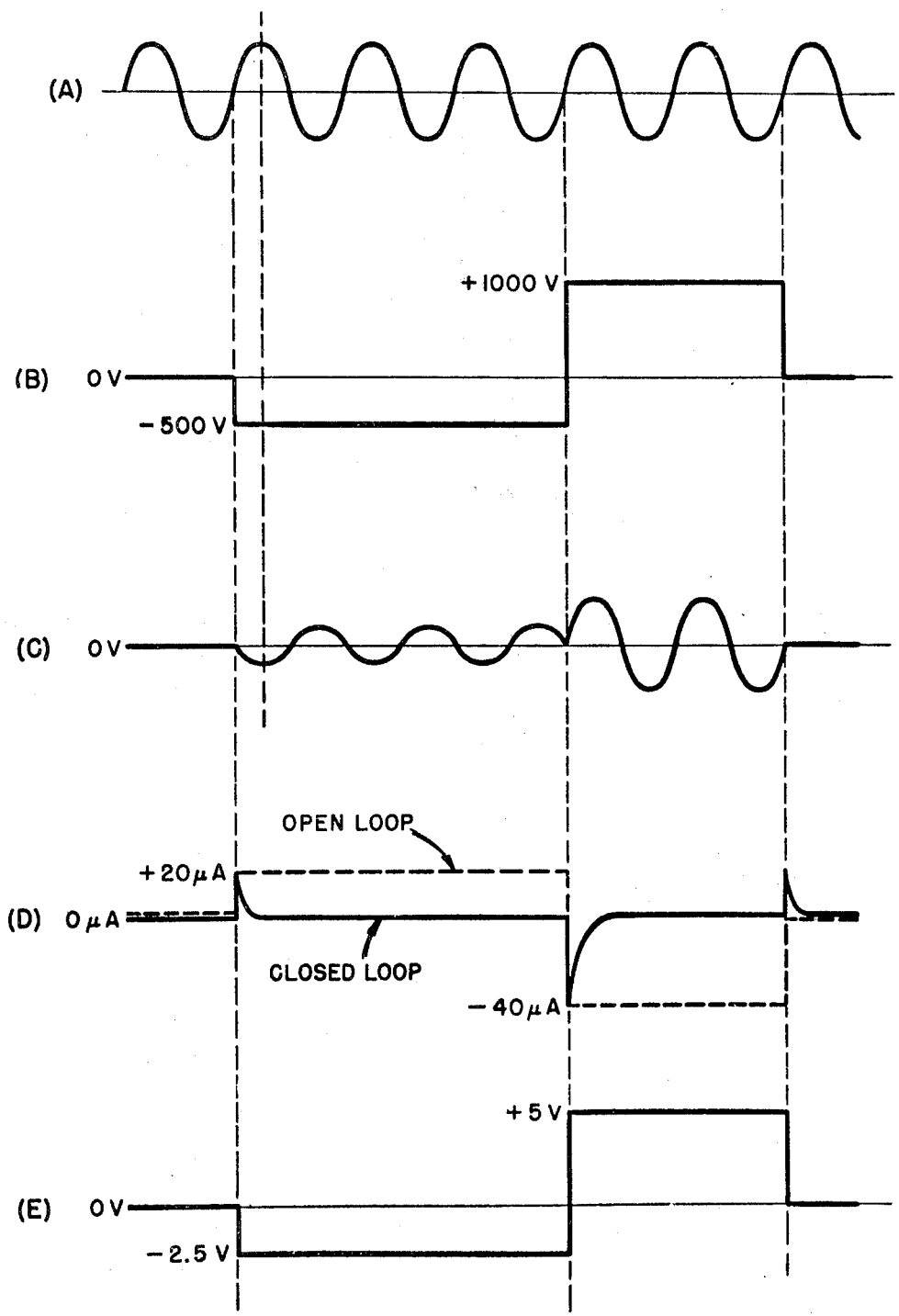
FIG. 6 is a diagram representing output waveforms from various elements of the Feedback Electrostatic Voltmeter combinations for a given illustrative input.

FIG. 6 illustrates the waveforms obtained at various points of the Feedback Electrostatic Voltmeter assuming the input shown in Graph B. There it appears that the electrostatic potential changes from 0 to −500 volts to +1,000 volts. The reference signal phase shifted by 90° is shown in Graph A; this is the constant alternating voltage waveform that would appear at the reference signal output from the Network Board 120. Graph C shows the modulated detected signal output of the Detector probe.

The signals shown in Graphs A and C are then amplified by tuned amplifier 22 and 22' respectively and are fed to the Phase Sensitive Detector 26 via Isolation Transformers 24 and 24'. Graph D illustrates the detected output of the Phase Sensitive Detector, for both the open and closed integrator loop. The Feedback Electrostatic Voltmeter is normally operated in the closed loop position, the integrating capacitor C60 driving the signal output from the Phase Modulator Detector to zero.

The output from the Phase Sensitve Detector is then fed to the Booster Amplifier 30 via Operational Amplifier 28, which inverts the signal. Graph E illustrates the Booster output which is applied to the midpoint of the Squarer Inverter.

Assuming +5 volts is obtained at the Booster output which is then chopped at 1,080 cps by the Inverters, the waveforms of +10 volts peak-to-peak and −20 peak-to-peak as illustrated in FIG. 5 are obtained at the Squarer Inverter outputs as explained heretofore.

The Operational Amplifier 28, Booster Amplifier 30, Squarer Inverter 32, Step-Up Transformer T-5 and T-6, Demodulator 50 and Integrating Capacitor C60 comprise a High Voltage Integrator Operational Amplifier. The feedback loop of the integrator is closed via C60 (see FIGS. 1 and 2), thus converting the high gain amplifier, having an open loop gain approximately $10^7$, into an integrator. The high voltage amplifier is an efficient means to greatly increase the input signal level linearly, and without the introduction of noise components. The various sources of 60 cycle noise are injected by stray capacitance and leakage into the integrator output. This noise is conveniently minimized by injecting into the integrator input, 60 cycle currents both in phase and in phase quadrature which are adjustable in amplitude and capable of phase reversal. These adjustments are available as the R BAL and C BAL adjustments in the Phase Sensitive Detector (FIG. 3) and permit nulling the 60 cycle component of output noise.

To achieve best accuracy and stability, the High Voltage output from this device (±2KV) is not used directly as an output but rather is attenuated by a high resistance, temperature compensated attenuator R-107 and fed to Operational Amplifier 60 connected as a precision voltage follower. The demodulator output is limited to ±2KV because the booster output is limited to approximately ±10 volts. As the linear output range of the operational amplifier is 10 volts maximum, an attenuation factor of 200:1 is dictated. This ratio is set precisely by R-108.

The amplifier output is of very low impedance (typically less than 0.1 ohms) with the result that loading errors are negligible and both the recorder and meter can be utilized simultaneously.

The various electrical components may be powered from a central power supply fed from a 60 cps input.

The circuits illustrated comprise solid state elements to achieve best results. This is especially applicable for the High Voltage Operational Amplifier. The following advantages are obtained.

1. Low voltage and current drift
2. High Open Loop Gain
3. Low Phase shift at a given frequency
4. Faster Slewing Rate Limited—the speed of response is not bandwidth limited since the gain of the circuits is obtained from High Voltage Operational Amplifier Amplifer rather than from tuned amplifiers.

Having described the invention, I claim the following:

1. A high gain amplifier system comprising:

an operational amplifier having an input and an output, a square wave drive source of predetermined frequency, a first inverter means having first and second transistors, each having a base, an emitter and a collector electrode, the source of square waves being connected across the base electrodes of the first and second transistors to alternately drive them into conduction at the predetermined frequency.

a first step-up transformer having a center-tapped primary winding and a secondary winding, the primary winding being connected across corresponding electrodes of the first and second transistors other than the base electrodes, the remaining corresponding electrodes of the first and second transistors other than the base electrodes being connected to form a first common connection, a second inverter means having third and fourth transistors, each having a base, an emitter and collector electrode, the source of square waves being connected across the base electrodes of the third and fourth transistors to alternately drive them into conduction at the predetermined frequency, a second step-up transformer having a center-tapped primary winding and a secondary winding, the primary winding being connected across corresponding electrodes of the third and fourth transistors other than the base electrodes, the remaining corresponding electrodes of the third and fourth transistors other than the base electrodes being connected to form a second common connection, a power supply having positive and negative supply terminals, one of the supply terminals being connected to the center tap of the primary winding of the first step-up transformer, the other supply terminal being connected to the second common connection, means connecting the output of the operational amplifier to feed the first common connection and the center-tap of the primary winding of the second step-up transformer, the first and second inverters thereby providing output signals to the first and second step-up transformers respectively dependent upon the magnitude and polarity of the output of the operational amplifier and modulated at the predetermined frequency, first and second demodulators connected to the secondary windings of the first and second step-up transformers respectively to demodulate the outputs thereof to produce high gain output signals.

2. The high gain amplifier system as recited in claim 1 wherein there are further provided:

combining means connected to the outputs of said first and second demodulators to produce a single signal output.

3. The high gain amplifier as recited in claim 2 wherein there is further provided:

an integrating capacitor connected between said combining means and the input of the operational amplifier system.

4. The high gain amplifier as described in claim 1 wherein there is further provided:

a booster amplifier connected between said operational amplifier and said first and second inverter means.

* * * * *